United States Patent
Ignaczak

(10) Patent No.: US 8,020,898 B2
(45) Date of Patent: Sep. 20, 2011

(54) SINGLE-BOLT BAND CLAMP WITH GASKETED CENTER RIB AND PIPE LAP JOINT USING THE SAME

(75) Inventor: Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 12/363,395

(22) Filed: Jan. 30, 2009

(65) Prior Publication Data

US 2009/0189392 A1 Jul. 30, 2009

Related U.S. Application Data

(60) Provisional application No. 61/024,752, filed on Jan. 30, 2008.

(51) Int. Cl.
*F16L 17/00* (2006.01)
(52) U.S. Cl. .................................... 285/367; 285/373
(58) Field of Classification Search .................. 285/373, 285/367, 420, 419; 277/279, 284
See application file for complete search history.

(56) References Cited

U.S. PATENT DOCUMENTS

| | | | | |
|---|---|---|---|---|
| 184,599 | A * | 11/1876 | Ehrhardt | 24/456 |
| 785,350 | A * | 3/1905 | Custer | 285/373 |
| 1,451,731 | A * | 4/1923 | Higdon | 285/290.3 |
| 2,708,307 | A * | 5/1955 | Newell et al. | 29/463 |
| 2,828,986 | A * | 4/1958 | Mahoff et al. | 285/233 |
| 3,042,430 | A * | 7/1962 | Guy | 285/365 |
| 3,052,491 | A * | 9/1962 | Grass | 285/233 |
| 3,537,147 | A * | 11/1970 | Pfeuffer | 24/20 TT |
| 3,851,901 | A * | 12/1974 | Sills | 285/112 |
| 4,101,151 | A * | 7/1978 | Ferguson | 285/236 |
| 4,360,227 | A * | 11/1982 | Bridges | 285/373 |
| 4,380,348 | A * | 4/1983 | Swartz | 285/236 |
| 4,616,858 | A * | 10/1986 | Sauer | 285/235 |
| 4,659,870 | A * | 4/1987 | Jones | 174/84 S |
| 4,664,428 | A * | 5/1987 | Bridges | 285/373 |
| 5,383,496 | A | 1/1995 | Bridges et al. | |
| 5,765,876 | A * | 6/1998 | Bridges | 285/15 |
| 5,769,467 | A * | 6/1998 | Bridges | 285/370 |
| 5,944,365 | A * | 8/1999 | Kizler et al. | 285/420 |

(Continued)

FOREIGN PATENT DOCUMENTS

KR 10-2002-0036785 5/2002

(Continued)

OTHER PUBLICATIONS

International Search Report for PCT/US2009/032664, Sep. 10, 2009, 3 pages.

*Primary Examiner* — Aaron Dunwoody
(74) *Attorney, Agent, or Firm* — Reising Ethington P.C.

(57) ABSTRACT

A band clamp that connects overlapping pipe ends includes a band, a tightening mechanism, and a gasket. The band has a radially protruding rib, a first lateral section that extends from a side of the rib, and a second lateral section that extends from another side of the rib. The tightening mechanism connects to the band and is operable to tighten the band, and the gasket is received in the rib. In one example, an axial width of the lateral sections are within a range relative to an axial width of the rib, and in another example, the lateral sections are angled inwardly with relative to an axis of the band.

18 Claims, 3 Drawing Sheets

U.S. PATENT DOCUMENTS

| | | | | |
|---|---|---|---|---|
| 5,961,161 | A * | 10/1999 | Sponer | 285/373 |
| 6,302,450 | B1 * | 10/2001 | Dole et al. | 285/328 |
| 6,328,352 | B1 * | 12/2001 | Geppert et al. | 285/373 |
| 6,758,501 | B2 * | 7/2004 | Amedure et al. | 285/373 |
| 6,877,780 | B2 * | 4/2005 | Potts et al. | 285/420 |
| 7,025,393 | B2 | 4/2006 | Amedure et al. | |
| 7,249,790 | B2 * | 7/2007 | Potts et al. | 285/420 |
| 7,252,310 | B2 | 8/2007 | Amedure et al. | |
| 7,320,486 | B2 | 1/2008 | Geppert et al. | |
| 7,410,192 | B2 * | 8/2008 | Ignaczak et al. | 285/373 |
| 7,490,871 | B2 * | 2/2009 | Avram et al. | 285/420 |
| 7,520,539 | B2 * | 4/2009 | Ignaczak et al. | 285/367 |
| 7,571,940 | B2 * | 8/2009 | Krausz et al. | 285/421 |
| 2002/0014772 | A1 * | 2/2002 | Amedure et al. | 285/373 |
| 2003/0015872 | A1 * | 1/2003 | Potts et al. | 285/420 |
| 2004/0222633 | A1 * | 11/2004 | Amedure et al. | 285/373 |
| 2005/0184522 | A1 * | 8/2005 | Potts et al. | 285/420 |
| 2006/0107498 | A1 * | 5/2006 | Ignaczak et al. | 24/279 |
| 2006/0175837 | A1 * | 8/2006 | Ignaczak et al. | 285/420 |
| 2007/0063514 | A1 * | 3/2007 | Noda | 285/366 |
| 2008/0185841 | A1 | 8/2008 | Ignaczak et al. | |

FOREIGN PATENT DOCUMENTS

KR    10-2004-0080334    9/2004

* cited by examiner

SINGLE-BOLT BAND CLAMP WITH GASKETED CENTER RIB AND PIPE LAP JOINT USING THE SAME

CROSS-REFERENCE TO RELATED APPLICATIONS

This application claims the priority of U.S. Provisional Patent Application No. 61/024,752, filed Jan. 30, 2008, the complete disclosure of which is hereby incorporated by reference.

TECHNICAL FIELD

This invention relates to pipe clamps and more particularly to band clamps used to secure pipe ends in a lap joint configuration.

BACKGROUND OF THE INVENTION

United States Patent Application No. 2006/0175837 A1 discloses various embodiments of a pipe clamp having a gasketed center rib that can be used to clamp and seal a pair of ribbed pipe ends. One of the disclosed pipe clamp embodiments (FIGS. 1-4) is in the form of a one-bolt band clamp that can be used for telescopic pipe connections in which one pipe end fits into the other pipe end in an overlapping configuration. Such telescopic connections of the pipe ends are also referred to as a lap joint. These band clamps often can use only a single bolt, with the clamping force from tightening of the bolt being transferred by the clamp to the outer pipe end and through that to the inner pipe end, resulting in sufficient clamping pressure to provide a gas-tight seal of the two pipe ends.

Another of the disclosed embodiments (FIGS. 5-11) from US 2006/0175837 A1 is a two-bolt pipe coupler in which the pipe ends are connected in an abutted end-to-end configuration with no overlapping of the ends. Pipe couplers used in these abutting types of pipe connections typically have a longer axial length so that there is sufficient clamp-to-pipe connection for each of the two pipes. Consequently, these pipe couplers normally use at least two bolts so that sufficient clamping force is applied to each of the two pipe ends. This helps protect against bending moments that might be applied to the clamped joint during installation or when in service. Such bending moments involve a force being applied to the clamped joint that attempts to move one or more of the components (pipes and clamp) in a manner that would tend to cause their axes come out of alignment with each other. Where a clamped joint does not have sufficient stiffness, these bending moments can be responsible for a loss of a gas-tightness at the joint which, for automotive exhaust and various other applications, can be undesirable.

In a lap joint, the telescopic connection of the two pipe ends helps protect against the effects of bending moments on the joint by keeping the two pipe ends generally aligned. However, the pipe end connection can still be adversely affected by these bending moments and this can be for various reasons, including differences in outer diameter of the inner pipe versus the inner diameter of the outer pipe which may present a loose interconnection of the two pipes that permits a small angle to exist between the two pipes' axes. These differences in diameter are common as they may nominally be introduced into the design of the pipe ends to accommodate manufacturing tolerances. And while the clamping pressure from the band clamp helps stiffen the joint, it is nonetheless applied at a single axial location. Thus, in single-bolt designs such as shown in the above-noted published application, the clamping pressure is applied primarily via the clamp's gasket. For some applications, this provides a suitable seal at the joint; however, for certain other applications, it may be desirable to achieve a stiffer connection that provides additional sealing resistance to bending moments.

SUMMARY OF THE INVENTION

One aspect of the invention is directed to a band clamp that connects a first and second pipe end in an overlapping configuration. The band clamp includes a band, a tightening mechanism, and a gasket. The band extends circumferentially from a first end to a second end, and extends axially between a pair of axial ends. The band includes a radially protruding rib that extends circumferentially part way or more between the first and second ends and that is located inwardly of the axial ends. The band further includes a first lateral section that extends from a side of the rib, and includes a second lateral section that extends from a side of the rib opposite the first lateral section. Each of the first and second lateral sections has an axial width with a value within a range of about 50 to 150 percent of an axial width of the rib. The tightening mechanism is connected to the band and brings the first and second ends toward each other in order to tighten the band. The gasket is located in a radial direction beneath the band, and in an axial direction within or greater than the rib.

Another aspect of the invention is directed to a band clamp that connects a first and second pipe end in an overlapping configuration. The band clamp includes a band, a tightening mechanism, and a gasket. The band extends circumferentially from a first end to a second end, and extends axially between a pair of axial ends. The band includes a radially protruding rib that extends circumferentially part way or more between the first and second ends and that is located inwardly of the axial ends. The band further includes a first lateral section that extends from a side of the rib, and includes a second lateral section that extends from a side of the rib opposite the first lateral section. Each of the first and second lateral sections is angled in a radially inward direction with respect to an axis of the band at an angle having a value within a range of about 0.5 to 5 degrees. The tightening mechanism is connected to the band and brings the first and second ends toward each other in order to tighten the band. The gasket is located in a radial direction beneath the band, and in an axial direction within or greater than the rib. When the band is tightened, each of the first and second lateral sections is angled at about 0 degrees with respect to the band axis and produces a mostly flush interface with a surface located immediately below the lateral sections.

Another aspect of the invention is directed to a lap joint. The lap joint includes a first pipe with a first pipe end and a second pipe with a second pipe end. The first and second pipe ends are fit telescopically together. The lap joint also includes a band clamp. The band clamp includes a band, a tightening mechanism, and a gasket. The band extends circumferentially from a first end to a second end, and extends axially between a pair of axial ends. The band includes a radially protruding rib that extends circumferentially part way or more between the first and second ends and that is located inwardly of the axial ends. The band further includes a first lateral section that extends from a side of the rib, and includes a second lateral section that extends from a side of the rib opposite the first lateral section. Each of the first and second lateral sections has an axial width with a value that is about equal to an axial width of the rib. The tightening mechanism is connected to the band and brings the first and second ends toward each other in order to tighten the band. The gasket is located in a radial direction beneath the band, and in an axial direction within or greater than the rib. When the band clamp is placed over the pipes, one of the lateral sections is tightened over the first pipe end while the other of the lateral sections is tightened over the second pipe end.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

As used herein, the terms axially, angularly, and radially refer to directions relative to the cylindrically tubular shape of the illustrated pipes and band clamp, so that the axial direction extends along the axis of this tubular shape, radial directions extend radially away from this axis, and angularly refers to locations at points around the circumference of the band clamp.

Figure 1:
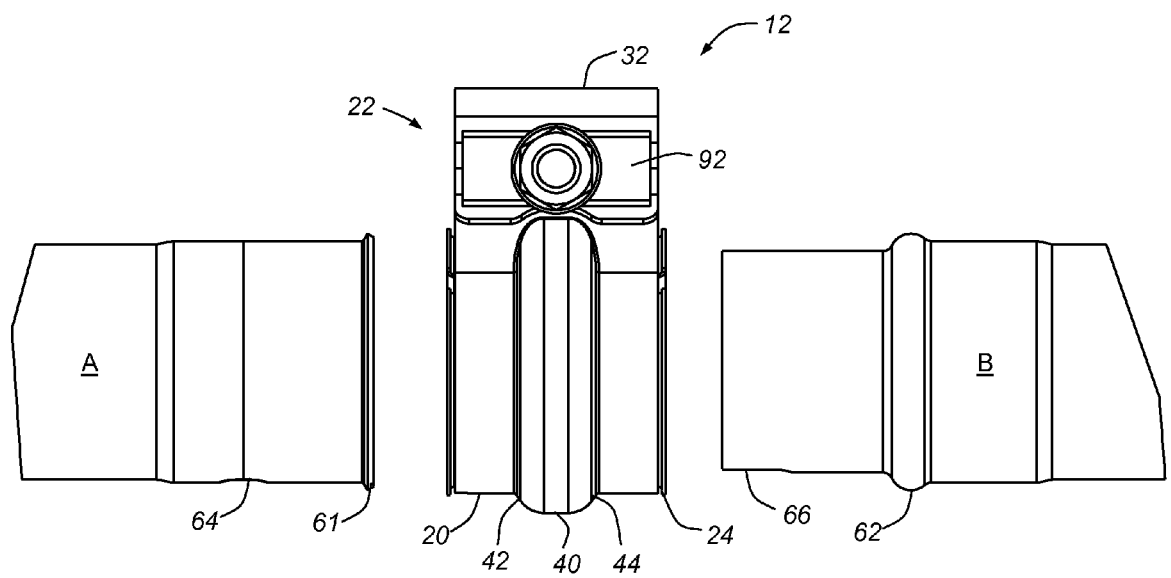
FIG. 1 is a side view of an exemplary embodiment of a band clamp and a pair of unassembled pipe ends.
Figure 2:
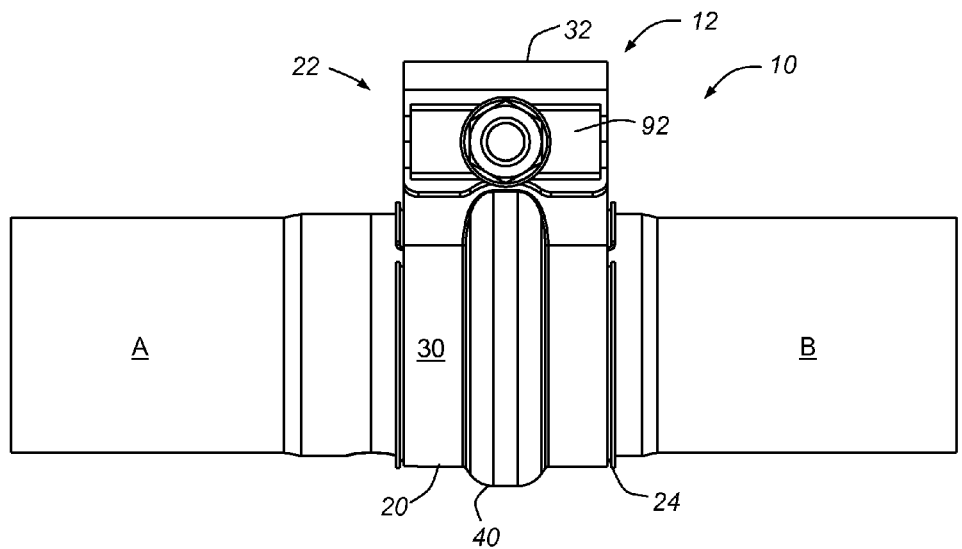
FIG. 2 is a side view of the band clamp and pipe ends of FIG. 1, shown in an assembled state.
Figure 3:
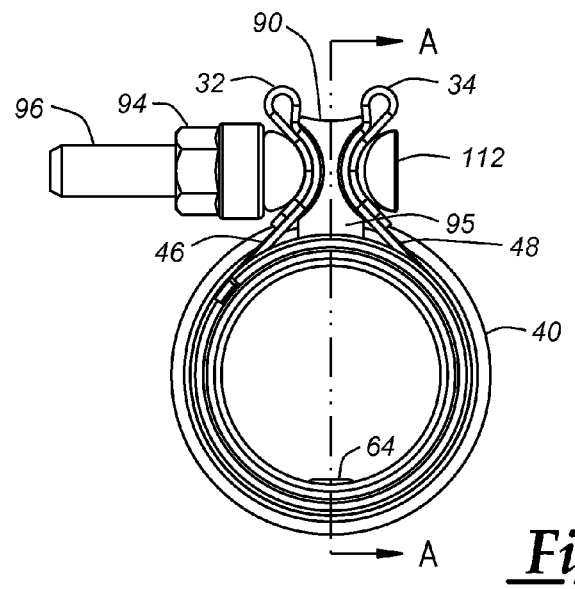
FIG. 3 is a front view of the band clamp of FIG. 1.
Figure 4:
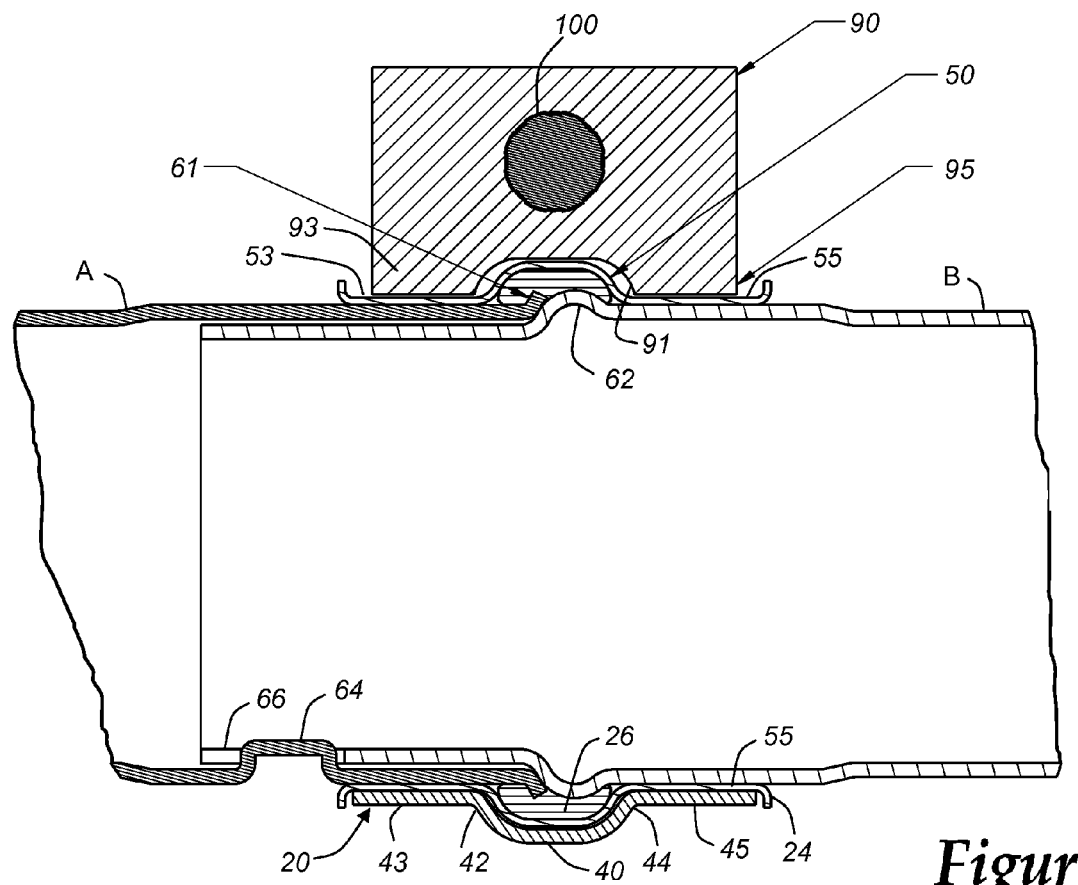
FIG. 4 is a sectional view taken along line 4-4 in FIG. 3.

FIGS. 1-4 depict a band clamp 12 and overlapping ends of two pipes A and B that together are assembled as shown in FIGS. 2-4 into a clamped pipe joint 10. In general, the joint 10 is formed by placing the clamp 12 loosely over one pipe end (e.g., over the end of pipe A), inserting the other pipe end through the clamp and into an overlapping position relative to the first pipe end, and then tightening the clamp to secure the two pipes A and B together.

Band clamp 12 includes the same general components disclosed in U.S. Patent Application Publication No. 2006/0175837 A1 in connection with the band clamp 10 (FIGS. 1-4) and band clamp 318 (FIGS. 16-17) of that published application. The various details of construction and use of the various components apply equally to band clamp 12 discussed herein, and that published application is therefore hereby incorporated by reference. Accordingly, band clamp 12 includes a band 20, a tightening mechanism 22, a sleeve 24 and a gasket 26. Band 20 is a flat band of sheet steel formed into an open loop, and it includes a main body portion 30 with a pair of opposing flanges 32 and 34 located at each end. Tightening mechanism 22 is used to draw flanges 32, 34 together during tightening of the band clamp, which has the effect of constricting all of the band clamp components around the pair of pipe ends. For this purpose, tightening mechanism 22 includes a contoured reaction member 90, a half-round backing plate 92, and a nut and bolt fastener combination 94, 96 in which the bolt 96 comprises a T-bolt having a half-round head 112. Like band 20, sleeve 24 and gasket 26 are also flat band-shaped components in the form of an open loop, and these components are sized such that gasket 26 fits within sleeve 24 which in turn fits within band 20. Body portion 30 includes a radially protruding center rib 40, a pair of annular side walls 42, 44 and a pair of transitional sections 46, 48. Center rib 40 is bound by annular side walls 42, 44 and by sections 46, 48, and this center rib circumferentially extends around body portion 30 with a uniform axial width. The axial width of center rib 40 can be somewhat greater or less than the embodiment shown here, depending upon the particular application for which the band clamp is used. Center rib 40 circumferentially terminates at the transition sections 46, 48 at each end which taper back into body portion 30. Sleeve 24 is preferably an open loop-shaped component that is designed to seat within center rib 40 and receive gasket 26, and for this purpose includes its own center rib 50 that is shaped to fit closely within rib 40 of body portion 30. Sleeve 24 can have mating circumferential ends that engage each other during tightening, such as those disclosed in U.S. Pat. No. 6,758,501 which is hereby incorporated by reference.

Although band clamp 12 disclosed herein utilizes the same basic components as band clamp 10 of the afore-mentioned U.S. published application, there are several significant differences. In particular, band clamp 12 has been designed so that the size of the gasket 26 and ribs 40 and 50 are reduced which allows the formation of lateral band sections 43, 45. These lateral sections each have an axial width that is approximately equal to that of the rib 40 (i.e., within the range of 50%-150% of the width of the rib 40), although they can be even greater than 150% of the width of the rib. In some embodiments, the width of these lateral sections 43, 45 is at least 75% of the width of the rib 40, and in other embodiments can be within the range of 75%-125% of the width of the rib. Within the tightening mechanism 22, the reaction member 90, backing plate 92, and T-bolt head 112 are elongated so that they contact the flanges 32, 34 on both sides of the rib 40 in a position at least partially aligned or overlapping with the lateral sections 43, 45. This is shown in FIGS. 1, 2 and 4. In this way, the force of the tightened nut and bolt fastener is spread across the flanges and transferred to the lateral sections 43, 45, thus allowing direct metal-to-metal contact of the clamp to the pipes A and B and thereby providing the joint 10 with increased stiffness and resistance to bending moments that may be experienced in use. Where the sleeve 24 extends axially to or past the band 20, it can also include corresponding lateral sections 53, 55 through which the clamping pressure from band 20 is applied.

As shown in FIG. 4, to further assist in applying the compressive force at the lateral sections 53, 55 of the sleeve 24, the reaction member 90 includes a notch 91 that defines two lateral feet 93, 95 that engage sleeve 24 during tightening. Depending on the particular application, the depth of the notch 91 relative to the two feet and to the bolt clearance hole 100 can be selected as desired to control the relative amount of clamping pressure applied to the rib 50 by the notch 91 versus that applied to the lateral sections 53, 55 of the sleeve via the feet 93, 95. In one embodiment, the width of the rib 50 can be approximately 16 mm, with the notch 91 being slightly wider, and the width of the two feet 93, 95 can be 13 mm each.

In conjunction with the reduction in size (in axial width) of the ribs 40 and 50, the pipe end interface which is sealed underneath the gasket 26 uses a rib or bead 62 on pipe B with an outward flare 61 being provided on the end of pipe A. As shown in FIG. 4, the angle and extent of the flare 61 is matched to that of the bead 62 so that they fit tightly together. Then, during tightening of the clamp 12, the gasket 26 is compressed to seal about this interface of the mating components 61, 62. At the same time, the lateral extensions 43, 45 apply clamping pressure to the pipes A and B to provide the desired stiffness to the pipe lap joint 10.

As will be appreciated, the lateral band sections 43, 45 are much greater in axial extent than those of the band clamps 10 and 318 of the afore-mentioned U.S. 2006/0175837 A1. See for comparison, the axial extensions 360 of FIG. 17 of that published application. In this regard, the lateral band sections 43, 45 are similar to those of the two-bolt pipe coupler of FIGS. 5-11 of U.S. 2006/0175837 A1, but instead are provided here in a band clamp that can be used for pipe lap joints and that has an overall axial width which, when used in conjunction with the axially-elongated components of the tightening mechanism 22, permits a stiff metal-to-metal connection at the lateral sections 43, 45 using only a single bolt.

Figure 5:
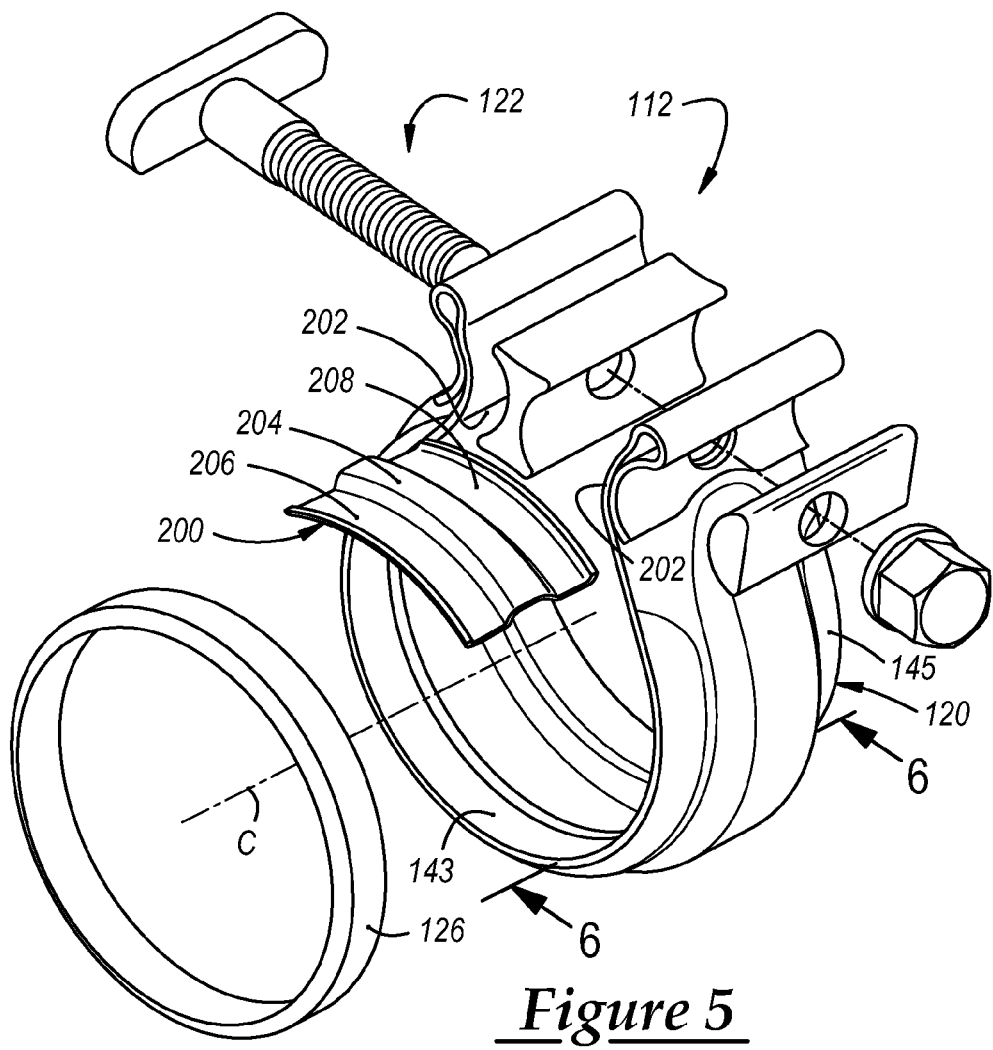
FIG. 5 is an exploded view of another exemplary embodiment of a band clamp.
Figure 6:
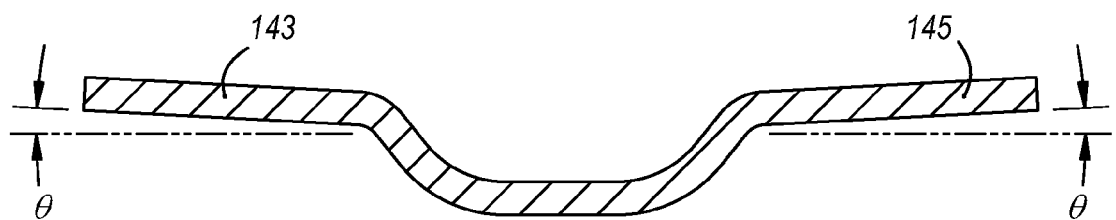
FIG. 6 is a sectional view taken along line 6-6 in FIG. 5.

FIGS. 5 and 6 depict another exemplary embodiment of a band clamp 112. Some of the subject matter previously described in reference to FIGS. 1-4 apply equally here and will not be repeated. Some of the differences in FIGS. 5 and 6 include lateral sections 143, 145 that are angled and a bridge 200.

In the illustrated embodiment, the lateral sections 143, 145 are angled radially inward with respect to an axis C of a band 120. In some cases, the angled lateral sections 143, 145 improve surface contact at an interface produced between the lateral sections and a surface positioned immediately below the sections, and improve a radially inward force generated upon tightening, both of which ultimately improve a seal formed at the lateral sections. An angle θ can be formed in the lateral sections 143, 145 by a successive roll-forming process or another suitable metalworking process. The angle θ extends along substantially all of the circumferential extent of the lateral sections, and extends along substantially all of the axial extent thereof. The circumferential and axial extensions of the angle θ can vary and can be more or less than shown. The value of the angle θ ranges between approximately 0.5° and 5°, and is approximately 3° in the illustrated embodiment of FIG. 6. The exact value of the angle θ will depend on, among other things, the desired amount of surface contact and increased tightening force. When tightened down, the angle θ is forced to 0° and produces a substantially flush interface between the lateral sections 143, 145 and the outer surface of the sleeve 24, or the outer surface of the pipes A and B.

The bridge 200 spans a break 202 located at a tightening mechanism 122 in the otherwise circumferentially continuous band 120, and protects against gas leakage thereat. When used, the bridge 200 replaces the sleeve 24 of FIGS. 1-4. The bridge 200 has an axial width approximately equal to that of the band 120, and has a circumferential length that is at least coextensive with the circumferential extent of the break 202; the width and length can be more or less than that shown. In cross-sectional profile, the bridge 200 generally matches that of the band 120 and has a second radially protruding rib 204 and a pair of lateral sections 206, 208 extending from sides thereof. The second rib 204 is similar to the rib 40 and when aligned they produce a substantially circumferentially continuous rib to receive a gasket 126. In assembly, the bridge 200 is located radially between the band 120 and the gasket 126, and when tightened the lateral sections 143, 145 make metal-to-metal contact with the underlying pipes A and B and form a seal thereat.

The subject matter described with reference to FIGS. 1-4 and to FIGS. 5 and 6 can be used interchangeably and is not limited to the particular illustrative embodiment in which it was described. For instance, the bridge 200 can replace the sleeve 24 in the embodiment of FIGS. 1-4, and need not be used with the angled lateral sections 143, 145.

For applications in which it is necessary or desirable to control the insertion depth of the pipe ends and/or set the rotational orientation of one or both pipes relative to the clamp 12 or to each other, the clamp can be welded to one of the pipe ends and/or the clamp or pipe(s) can include a notch (not shown) and/or a latch (also not shown) at one or both axial ends that engage a corresponding button (not shown) on one or both of the pipe end(s). The construction and use of the buttons, latches, and notches are more fully described in U.S. Patent Application Publication No. 2005/0099001 A1, published May 12, 2005 and assigned to the assignee of this application. This U.S. Patent Application Publication No. 2005/0099001 A1 is hereby incorporated by reference in its entirety. As one particular example, an inward button 64 can be formed near the end of pipe A with a mating notch 66 being formed into the end of pipe B so that a specific orientation of the two pipes can be easily achieved during clamping. This is best seen in FIG. 4. Other such arrangements will become apparent to those skilled in the art.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A band clamp for connecting overlapping first and second pipe ends, the band clamp comprising:

a band extending circumferentially from a first end to a second end and having a pair of axial ends, said band including a radially protruding rib extending circumferentially at least part way between said first and second ends and being located inwardly of said axial ends, said band including a first lateral section extending from a side of said rib and a second lateral section extending from an opposite side of said rib, each of said lateral sections having an axial width within a range of approximately 50-150% of an axial width of said rib;

a tightening mechanism connected to said band to bring said first and second ends toward each other to tighten said band, said tightening mechanism including a single bolt axially aligned with said rib; and a gasket located radially beneath said band and at least axially within said rib;

wherein, upon tightening of said tightening mechanism using said single bolt, said first and second lateral sections collapse circumferentially so as to apply clamping pressure to the first and second pipe ends along the axial width of said lateral sections, wherein the clamping pressure of said first and second lateral sections, when applied against the pipe ends, provides stiffness at a joint formed at the band clamp and the first and second pipe ends in order to help resist bending moments at the joint, wherein each of said lateral sections is angled radially inward with respect to an axis of said band at an angle within a range of approximately 0.5-5°.

2. The band clamp of claim 1, wherein each of said lateral sections has an axial width within a range of approximately 75-125% of the axial width of said rib.

3. The band clamp of claim 1, wherein each of said lateral sections has an axial width approximately equal to the axial width of said rib.

4. The band clamp of claim 1, wherein, upon assembly and tightening of said tightening mechanism, said first and second lateral sections make direct metal-to-metal contact respectively with the first and second pipe ends along at least a part of the circumferential extent of said lateral sections.

5. The band clamp of claim 1, wherein said angle is approximately 3°.

6. The band clamp of claim 1, wherein said first and second ends of said band include radially extending flanges formed from unitary end portions of said band, each of said end portions being folded back onto itself to form said respective flange, and each of said flanges having an aperture extending therethrough.

7. The band clamp of claim 6, wherein said tightening mechanism includes said bolt, a nut and a backing plate, said bolt being inserted through said apertures of said flanges and having a head extending in an axial direction with respect to said band a total distance that is approximately equal to an axial width of said band, wherein a first axial portion of said head substantially overlaps in the axial direction the axial width of said first lateral section and wherein a second axial portion of said head substantially overlaps in the axial direction the axial width of said second lateral section, and said backing plate extending in the axial direction a total distance that is approximately equal to the axial width of said band, wherein a first axial portion of said backing plate substantially overlaps in the axial direction the axial width of said first lateral section and wherein a second axial portion of said backing plate substantially overlaps in the axial direction the axial width of said second lateral section, and wherein a force generated upon tightening of said tightening mechanism is transferred to said first and second lateral sections via said first and second axial portions of said head and via said first and second axial portions of said backing plate.

8. The band clamp of claim 7, wherein said tightening mechanism includes a reaction member located between said flanges and extending in the axial direction a total distance that is approximately equal to the axial width of said band, wherein a first axial portion of said reaction member substantially overlaps in the axial direction the axial width of said first lateral section and wherein a second axial portion of said reaction member substantially overlaps in the axial direction the axial width of said second lateral section.

9. The band clamp of claim 1, wherein said gasket has an axial width approximately equal to the axial width of said rib.

10. The band clamp of claim 1, further comprising a split sleeve located radially between said band and said gasket.

11. The band clamp of claim 1, further comprising a bridge located radially between said band and said gasket and circumferentially spanning a break in the circumference of said band at said tightening mechanism.

12. A band clamp for connecting overlapping first and second pipe ends, the band clamp comprising:
a band extending circumferentially from a first end to a second end and having a pair of axial ends, said band including a radially protruding rib extending circumferentially at least part way between said first and second ends and being located inwardly of said axial ends, said band including a first lateral section extending from a side of said rib and a second lateral section extending from an opposite side of said rib, each of said lateral sections being angled radially inward with respect to an axis of said band at an angle within a range of approximately 0.5-5°;
a tightening mechanism connected to said band to bring said first and second ends toward each other to tighten said band; and
a gasket located radially beneath said band and at least axially within said rib;
wherein the angle of each of said lateral sections is forced to near 0° upon tightening of said tightening mechanism and produces a substantially flush interface with a surface located immediately below said respective lateral section, and wherein said lateral sections being angled provides an increased amount of metal-to-metal surface contact at the interface and increases a radially-inwardly-directed force generated at the interface upon tightening of said tightening mechanism.

13. The band clamp of claim 12, wherein said angle is approximately 3°.

14. The band clamp of claim 12, wherein each of said lateral sections has an axial width approximately equal to an axial width of said rib.

15. The band clamp of claim 12, wherein said first and second ends of said band include radially extending flanges formed from unitary end portions of said band, each of said end portions being folded back onto itself to form said respective flange, and each of said flanges having an aperture extending therethrough, and said tightening mechanism including a nut and bolt fastener, a backing plate, and a reaction member, said bolt being inserted through said apertures of said flanges and having a head extending in an axial direction with respect to said band a total distance that is approximately equal to an axial width of said band, said backing plate extending in the axial direction a total distance that is approximately equal to the axial width of said band, said reaction member located between said flanges and extending in the axial direction a total distance that is approximately equal to the axial width of said band, wherein a force generated upon tightening of said tightening mechanism is transferred to said first and second lateral sections via said head, backing plate, and reaction member.

16. The band clamp of claim 12, wherein said gasket has an axial width approximately equal to an axial width of said rib of said band, the band clamp further comprising a bridge located radially between said band and said gasket and circumferentially spanning a break in the circumference of said band at said tightening mechanism, said bridge including a radially protruding second rib aligned with said first rib of said band such that said first and second ribs together produce a substantially continuous rib to receive said gasket therein, and wherein, upon tightening of said tightening mechanism, said first and second lateral sections make direct metal-to-metal contact respectively with the first and second pipe ends along at least a part of the circumferential extent of said lateral sections.

17. A pipe lap joint, comprising:
a first pipe having a first pipe end;
a second pipe having a second pipe end fit telescopically within said first pipe end; and
a band clamp comprising:
a band extending circumferentially from a first end to a second end and having a pair of axial ends, said band including a radially protruding rib extending circumferentially at least part way between said first and second ends and being located inwardly of said axial ends, said band including a first lateral section extending from a side of said rib and a second lateral section extending from an opposite side of said rib, each of said lateral sections having an axial width approximately equal to an axial width of said rib;

a tightening mechanism connected to said band to bring said first and second ends toward each other to tighten said band, said tightening mechanism including a single bolt, a nut, and a backing plate, said bolt having a head extending in the axial direction with respect to said band a total distance that is approximately equal to the axial width of said band, wherein a first axial portion of said head substantially overlaps in the axial direction the axial width of said first lateral section and wherein a second axial portion of said head substantially overlaps in the axial direction the axial width of said second lateral section, said backing plate extending in the axial direction a total distance that is approximately equal to the axial width of said band, wherein a first axial portion of said backing plate substantially overlaps in the axial direction the axial width of said first lateral section and wherein a second axial portion of said backing plate substantially overlaps in the axial direction the axial width of said second lateral section; and a gasket located radially beneath said band and at least axially within said rib;

wherein said band clamp is placed over said pipe ends such that one of said lateral sections is tightened over said first pipe end and the other of said lateral sections is tightened over said second pipe end;

wherein, upon placement of said band clamp over said pipe ends and upon tightening of said tightening mechanism, clamping pressure is transferred to said pipe ends via said first and second lateral sections and along a total axial extent of said first and second lateral sections that is greater than the axial width of said rib, and clamping pressure is transferred to said first and second lateral sections via said first and second axial portions of said head and via said first and second axial portions of said backing plate, wherein each of said lateral sections is angled radially inward with respect to an axis of said band at an angle within a range of approximately 0.5-5°.

18. A band clamp for connecting abutting first and second pipe ends, the band clamp comprising:

a band extending circumferentially from a first end to a second end and having a pair of axial ends, said band including a radially protruding first rib extending circumferentially at least part way between said first and second ends and being located inwardly of said axial ends, said band including a first lateral section extending from a side of said first rib and a second lateral section extending from an opposite side of said first rib, each of said lateral sections being angled radially inward with respect to an axis of said band at an angle within a range of approximately 0.5-5°;

a tightening mechanism connected to said band to bring said first and second ends toward each other to tighten said band;

a gasket located radially beneath said band and at least axially within said first rib; and a bridge located radially between said band and said gasket and circumferentially spanning a break in the circumference of said band at said tightening mechanism, said bridge including a radially protruding second rib aligned with said first rib of said band such that said first and second ribs together produce a substantially continuous rib to receive said gasket therein;

wherein the angle of each of said lateral sections is forced to near 0° upon tightening of said tightening mechanism and produce a substantially flush interface with a surface located immediately below said respective lateral section.

\* \* \* \* \*